United States Patent
Shah et al.

(10) Patent No.: US 11,811,609 B2
(45) Date of Patent: Nov. 7, 2023

(54) STORAGE TARGET DISCOVERY IN A MULTI-SPEED AND MULTI-PROTOCOL ETHERNET ENVIRONMENT

(71) Applicant: International Business Machines Corporation, Armonk, NY (US)

(72) Inventors: Komal Shailendra Shah, Pune (IN); Subhojit Roy, Pune (IN); Subhamay Barui, Pune (IN); Anuj Chandra, Pune (IN)

(73) Assignee: International Business Machines Corporation, Armonk, NY (US)

( * ) Notice: Subject to any disclaimer, the term of this patent is extended or adjusted under 35 U.S.C. 154(b) by 1108 days.

(21) Appl. No.: 15/971,834

(22) Filed: May 4, 2018

(65) Prior Publication Data
US 2019/0342177 A1    Nov. 7, 2019

(51) Int. Cl.
*H04L 41/12*    (2022.01)
*H04L 41/0803*   (2022.01)

(52) U.S. Cl.
CPC .......... *H04L 41/12* (2013.01); *H04L 41/0803* (2013.01)

(58) Field of Classification Search
CPC ..... H04L 41/12; H04L 41/0803; H04L 67/34; H04L 41/083; H04L 47/2416; H04L 47/2483; H04L 65/80; H04L 65/1016; H04L 41/5051; H04L 41/5058; H04L 41/0894; H04L 69/329
See application file for complete search history.

(56) References Cited

U.S. PATENT DOCUMENTS

| | | | |
|---|---|---|---|
| 8,909,980 B1 * | 12/2014 | Lewis | G06F 11/00 714/4.11 |
| 2005/0226248 A1 * | 10/2005 | Modi | H04L 67/42 370/395.5 |
| 2005/0234941 A1 * | 10/2005 | Watanabe | G06F 3/061 |
| 2007/0226360 A1 | 9/2007 | Gupta et al. | |
| 2010/0100588 A1 * | 4/2010 | Huster | H04L 69/18 709/206 |
| 2010/0153975 A1 * | 6/2010 | Zwisler | G06F 3/0635 719/326 |
| 2014/0025817 A1 * | 1/2014 | Lau | H04L 49/254 709/225 |
| 2014/0092884 A1 * | 4/2014 | Murphy | H04L 41/0806 370/338 |

(Continued)

*Primary Examiner* — Hitesh Patel
(74) *Attorney, Agent, or Firm* — Zilka-Kotab, P.C.

(57) ABSTRACT

In one embodiment, a method includes determining at least one characteristic of a plurality of ports on an individual basis. The plurality of ports are hosted by a target system and configured to send and receive data. The method also includes creating port groupings, each port grouping including one or more of the plurality of ports. Ports are grouped together in a single port grouping based on at least one shared characteristic of individual ports in the single port grouping. In addition, the method includes receiving, from an initiator port, a target discovery request at a target port of the plurality of ports. Also, the method includes determining which particular port grouping the target port belongs to. Moreover, the method includes sending information about all ports in the particular port grouping to the initiator port in response to receiving the target discovery request from the initiator port.

23 Claims, 6 Drawing Sheets

(56) References Cited

U.S. PATENT DOCUMENTS

| | | | |
|---|---|---|---|
| 2015/0019696 A1* | 1/2015 | DeCusatis | H04L 69/22 |
| | | | 709/220 |
| 2015/0039787 A1 | 2/2015 | Voorhees et al. | |
| 2015/0333926 A1* | 11/2015 | Palazzolo | H04L 12/4641 |
| | | | 370/401 |
| 2016/0080209 A1* | 3/2016 | Ignatuk | H04L 41/12 |
| | | | 709/217 |
| 2016/0197824 A1* | 7/2016 | Lin | H04L 45/38 |
| | | | 370/389 |
| 2016/0241643 A1 | 8/2016 | Astigarraga et al. | |
| 2017/0041404 A1* | 2/2017 | Burbridge | H04L 67/141 |
| 2018/0034923 A1 | 2/2018 | Mendonca et al. | |
| 2019/0227812 A1* | 7/2019 | Akkineni | G06F 9/4416 |
| 2021/0294287 A1* | 9/2021 | Valin | G06Q 50/06 |

\* cited by examiner

STORAGE TARGET DISCOVERY IN A MULTI-SPEED AND MULTI-PROTOCOL ETHERNET ENVIRONMENT

BACKGROUND

The present invention relates to storage management in an Ethernet environment, and more specifically to discovering storage targets in a multi-speed and multi-protocol Ethernet environment using port grouping.

In data center environments, host and backend storage devices are connected for data transmissions via one or more interconnect protocols, such as Internet Small Computer Systems Interface (iSCSI), Fibre Channel (FC), iSCSI Extensions for Remote Direct Memory Access (iSER), Non-Volatile Memory Express over Fabrics (NVMeF), etc. In order to access the storage devices, hosts execute a discovery process to identify the various storage devices connected thereto, and then login to the storage device via one of the various interconnect protocols available between the storage device and host. Typically, this works like an initiator and a target communicating with each other, where an initiator discovers the target. After discovery of the target, the host logs in to the target and then is able to view the devices that are connected to the target.

However, when hosts and storage devices are interconnected via various different interconnect protocols, each connection may exhibit a different Ethernet speed. These different speeds are not currently accounted for in conventional Ethernet target port discovery and login models, and therefore optimal performance is not able to be achieved.

SUMMARY

According to an embodiment, a system includes a plurality of ports configured to send and receive data, a processing circuit coupled to the plurality of ports, and logic integrated with the processing circuit, executable by the processing circuit, or integrated with and executable by the processing circuit. The logic is configured to cause the processing circuit to determine at least one characteristic of the plurality of ports on an individual basis. The logic is also configured to cause the processing circuit to create port groupings, each port grouping including one or more of the plurality of ports. Ports are grouped together in a single port grouping based on at least one shared characteristic of individual ports in the single port grouping. In addition, the logic is configured to cause the processing circuit to receive, from an initiator port, a target discovery request at a target port of the plurality of ports. Also, the logic is configured to cause the processing circuit to determine which particular port grouping the target port belongs to. Moreover, the logic is configured to cause the processing circuit to send information about all ports in the particular port grouping to the initiator port in response to receiving the target discovery request from the initiator port.

According to another embodiment, a method includes determining at least one characteristic of a plurality of ports on an individual basis. The plurality of ports are hosted by a target system and configured to send and receive data. The method also includes creating port groupings, each port grouping including one or more of the plurality of ports. Ports are grouped together in a single port grouping based on at least one shared characteristic of individual ports in the single port grouping. In addition, the method includes receiving, from an initiator port, a target discovery request at a target port of the plurality of ports. Also, the method includes determining which particular port grouping the target port belongs to. Moreover, the method includes sending information about all ports in the particular port grouping to the initiator port in response to receiving the target discovery request from the initiator port.

According to yet another embodiment, a computer program product includes a computer readable storage medium having program instructions embodied therewith. The computer readable storage medium is not a transitory signal per se, and the embodied program instructions are executable by a processing circuit to cause the processing circuit to determine, by the processing circuit, at least one characteristic of a plurality of ports on an individual basis. The plurality of ports are hosted by a target system and configured to send and receive data. In addition, the embodied program instructions are executable by the processing circuit to cause the processing circuit to create, by the processing circuit, port groupings, each port grouping including one or more of the plurality of ports. Ports are grouped together in a single port grouping based on at least one shared characteristic of individual ports in the single port grouping. Also, the embodied program instructions are executable by the processing circuit to cause the processing circuit to receive, by the processing circuit from an initiator port, a target discovery request at a target port of the plurality of ports. Additionally, the embodied program instructions are executable by the processing circuit to cause the processing circuit to determine, by the processing circuit, which particular port grouping the target port belongs to. Moreover, the embodied program instructions are executable by the processing circuit to cause the processing circuit to send, by the processing circuit, information about all ports in the particular port grouping to the initiator port in response to receiving the target discovery request from the initiator port.

According to another embodiment, a system includes a processing circuit and logic integrated with the processing circuit, executable by the processing circuit, or integrated with and executable by the processing circuit. The logic is configured to cause the processing circuit to determine at least one characteristic of an initiator port, the at least one characteristic including a protocol used for communications. Also, the logic is configured to cause the processing circuit to send, from the initiator port to a target port hosted by a target system, a target discovery request. Moreover, the logic is configured to cause the processing circuit to receive information about all ports in a particular port grouping.

In another embodiment, a method includes determining at least one characteristic of an initiator port, the at least one characteristic including a protocol used for communications. Also, the method includes sending, from the initiator port to a target port hosted by a target system, a target discovery request. Moreover, the method includes receiving information about all ports in a particular port grouping.

Other aspects and embodiments of the present invention will become apparent from the following detailed description, which, when taken in conjunction with the drawings, illustrate by way of example the principles of the invention.

DETAILED DESCRIPTION

Figure 1:
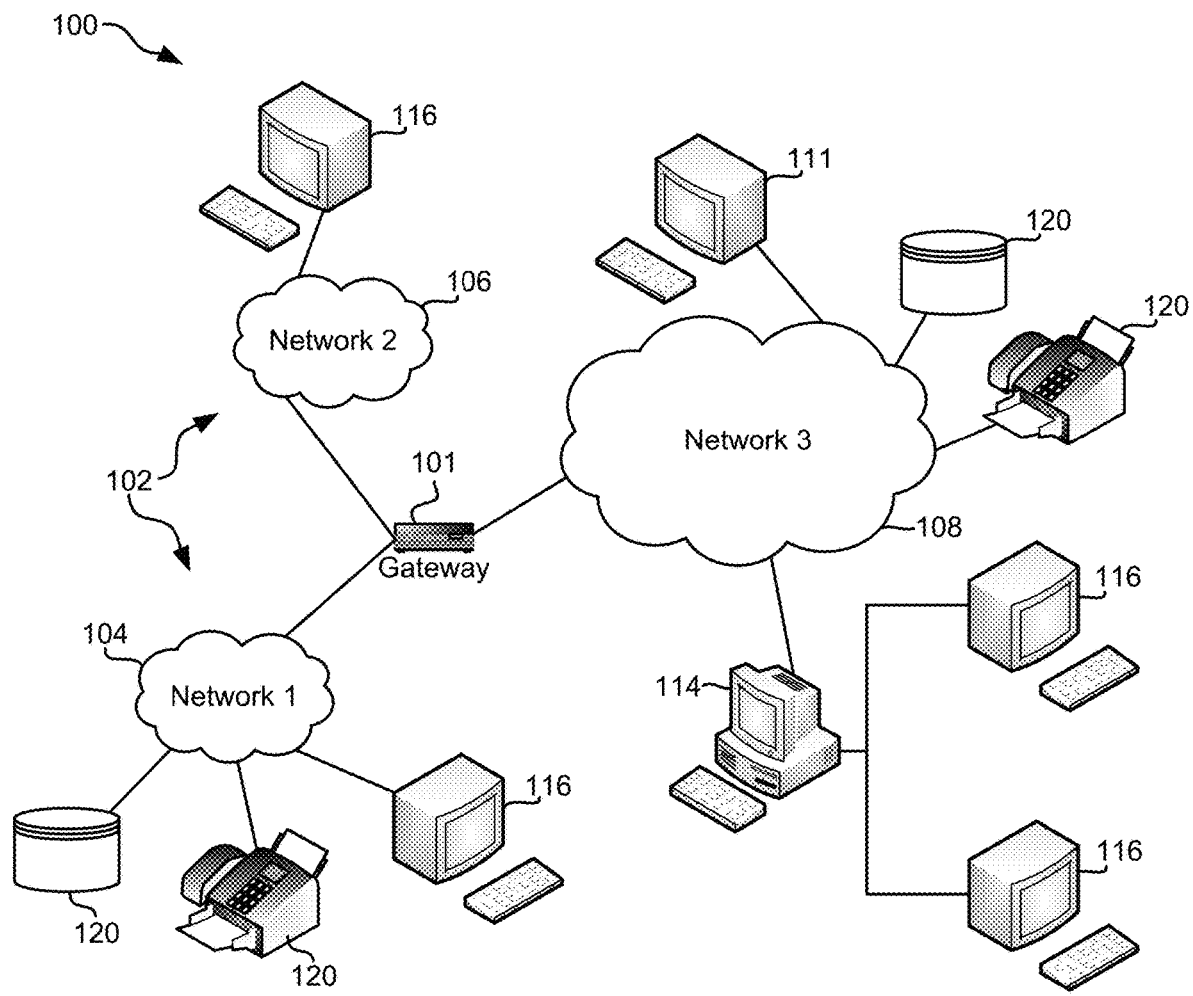
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "about" as used herein indicates the value preceded by the term "about," along with any values reasonably close to the value preceded by the term "about," as would be understood by one of skill in the art. When not indicated otherwise, the term "about" denotes the value preceded by the term "about" ±10% of the value. For example, "about 10" indicates all values from and including 9.0 to 11.0.

The following description discloses several preferred embodiments of systems, methods, and computer program products for storage target discovery in a multi-speed and multi-protocol Ethernet environment by utilizing port grouping.

According to a general embodiment, a system includes a plurality of ports configured to send and receive data, a processing circuit coupled to the plurality of ports, and logic integrated with the processing circuit, executable by the processing circuit, or integrated with and executable by the processing circuit. The logic is configured to cause the processing circuit to determine at least one characteristic of the plurality of ports on an individual basis. The logic is also configured to cause the processing circuit to create port groupings, each port grouping including one or more of the plurality of ports. Ports are grouped together in a single port grouping based on at least one shared characteristic of individual ports in the single port grouping. In addition, the logic is configured to cause the processing circuit to receive, from an initiator port, a target discovery request at a target port of the plurality of ports. Also, the logic is configured to cause the processing circuit to determine which particular port grouping the target port belongs to. Moreover, the logic is configured to cause the processing circuit to send information about all ports in the particular port grouping to the initiator port in response to receiving the target discovery request from the initiator port.

According to another general embodiment, a method includes determining at least one characteristic of a plurality of ports on an individual basis. The plurality of ports are hosted by a target system and configured to send and receive data. The method also includes creating port groupings, each port grouping including one or more of the plurality of ports. Ports are grouped together in a single port grouping based on at least one shared characteristic of individual ports in the single port grouping. In addition, the method includes receiving, from an initiator port, a target discovery request at a target port of the plurality of ports. Also, the method includes determining which particular port grouping the target port belongs to. Moreover, the method includes sending information about all ports in the particular port grouping to the initiator port in response to receiving the target discovery request from the initiator port.

According to yet another general embodiment, a computer program product includes a computer readable storage medium having program instructions embodied therewith. The computer readable storage medium is not a transitory signal per se, and the embodied program instructions are executable by a processing circuit to cause the processing circuit to determine, by the processing circuit, at least one characteristic of a plurality of ports on an individual basis. The plurality of ports are hosted by a target system and configured to send and receive data. In addition, the embodied program instructions are executable by the processing circuit to cause the processing circuit to create, by the processing circuit, port groupings, each port grouping including one or more of the plurality of ports. Ports are grouped together in a single port grouping based on at least one shared characteristic of individual ports in the single port grouping. Also, the embodied program instructions are executable by the processing circuit to cause the processing circuit to receive, by the processing circuit from an initiator port, a target discovery request at a target port of the plurality of ports. Additionally, the embodied program instructions are executable by the processing circuit to cause the processing circuit to determine, by the processing circuit, which particular port grouping the target port belongs to. Moreover, the embodied program instructions are executable by the processing circuit to cause the processing circuit to send, by the processing circuit, information about all ports in the particular port grouping to the initiator port in response to receiving the target discovery request from the initiator port.

According to another general embodiment, a system includes a processing circuit and logic integrated with the processing circuit, executable by the processing circuit, or integrated with and executable by the processing circuit. The logic is configured to cause the processing circuit to determine at least one characteristic of an initiator port, the at least one characteristic including a protocol used for communications. Also, the logic is configured to cause the processing circuit to send, from the initiator port to a target port hosted by a target system, a target discovery request. Moreover, the logic is configured to cause the processing circuit to receive information about all ports in a particular port grouping.

In another general embodiment, a method includes determining at least one characteristic of an initiator port, the at least one characteristic including a protocol used for communications. Also, the method includes sending, from the initiator port to a target port hosted by a target system, a target discovery request. Moreover, the method includes receiving information about all ports in a particular port grouping.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
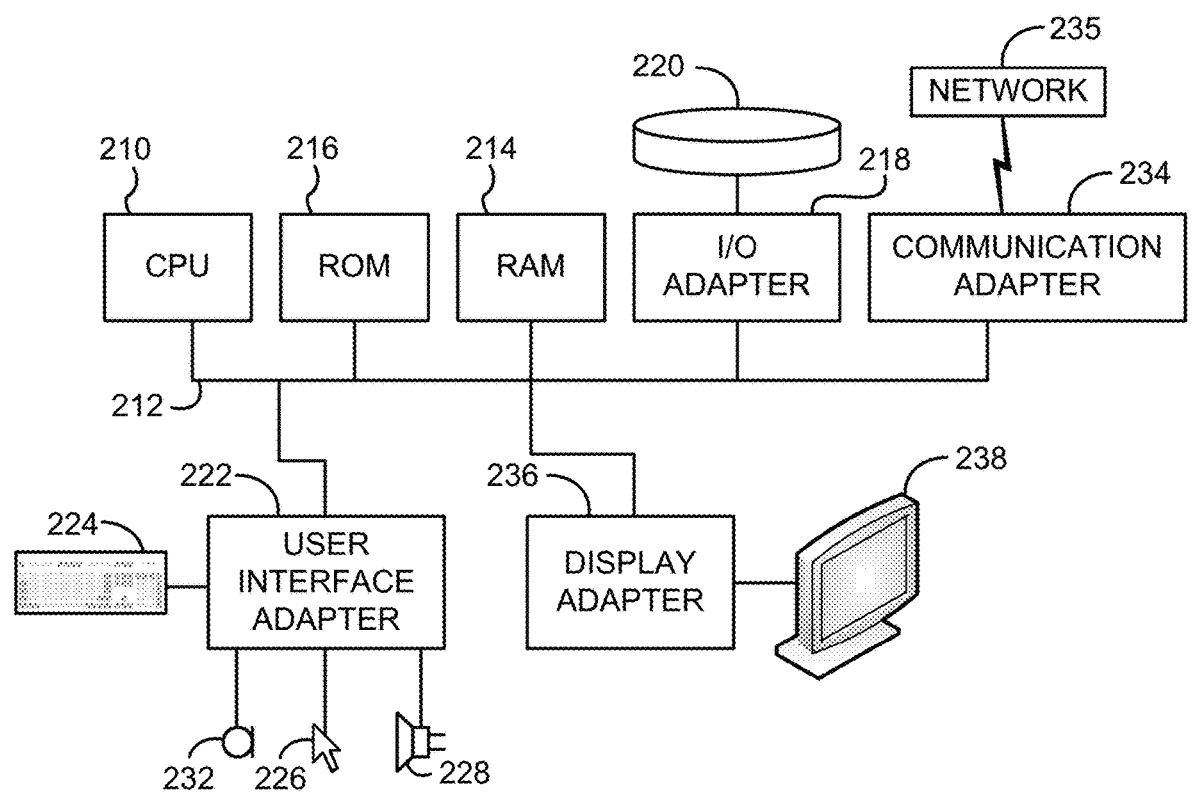
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

Figure 3:
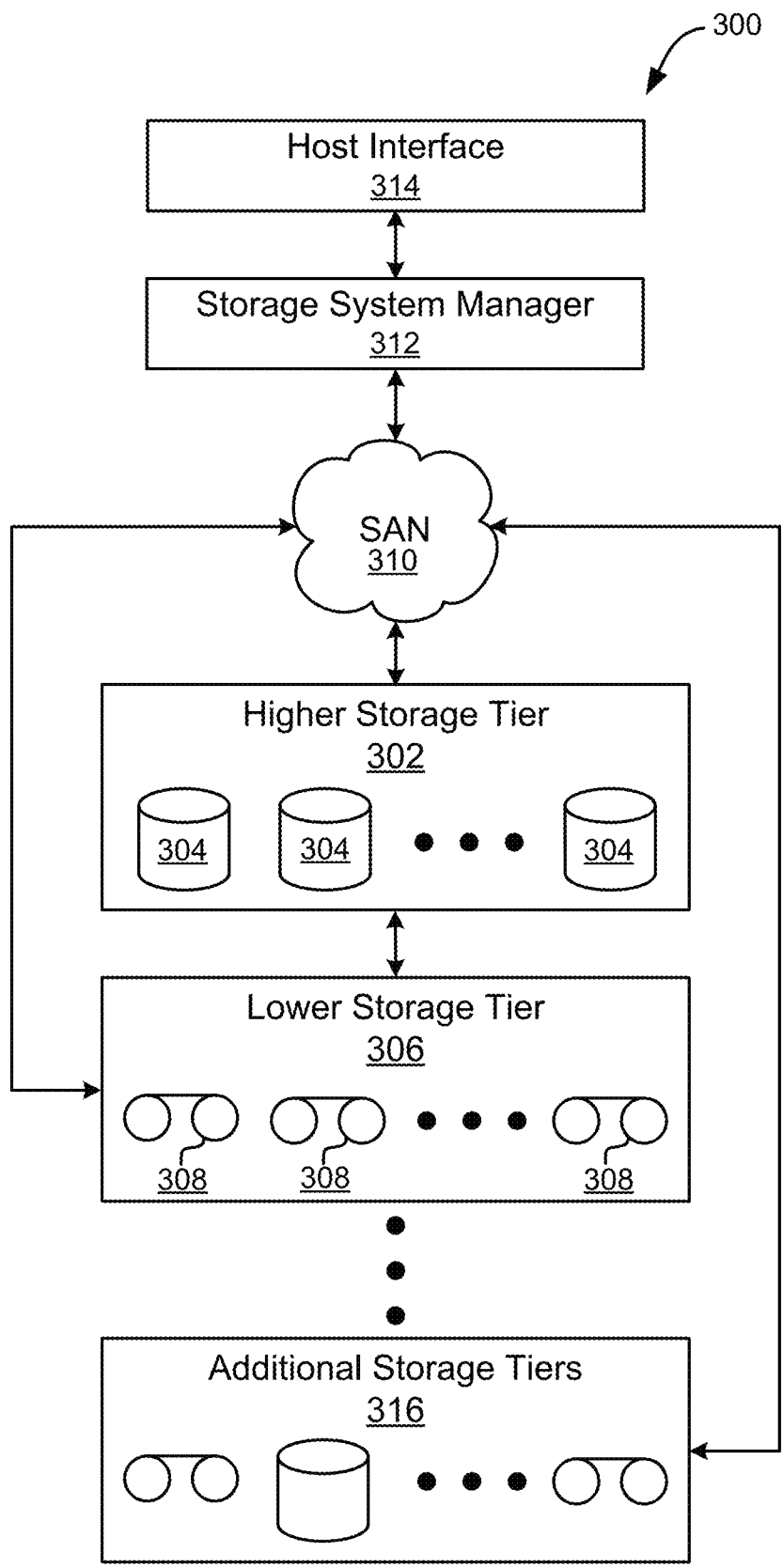
FIG. 3 illustrates a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media and/or drives on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the drives and/or storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

Figure 4:
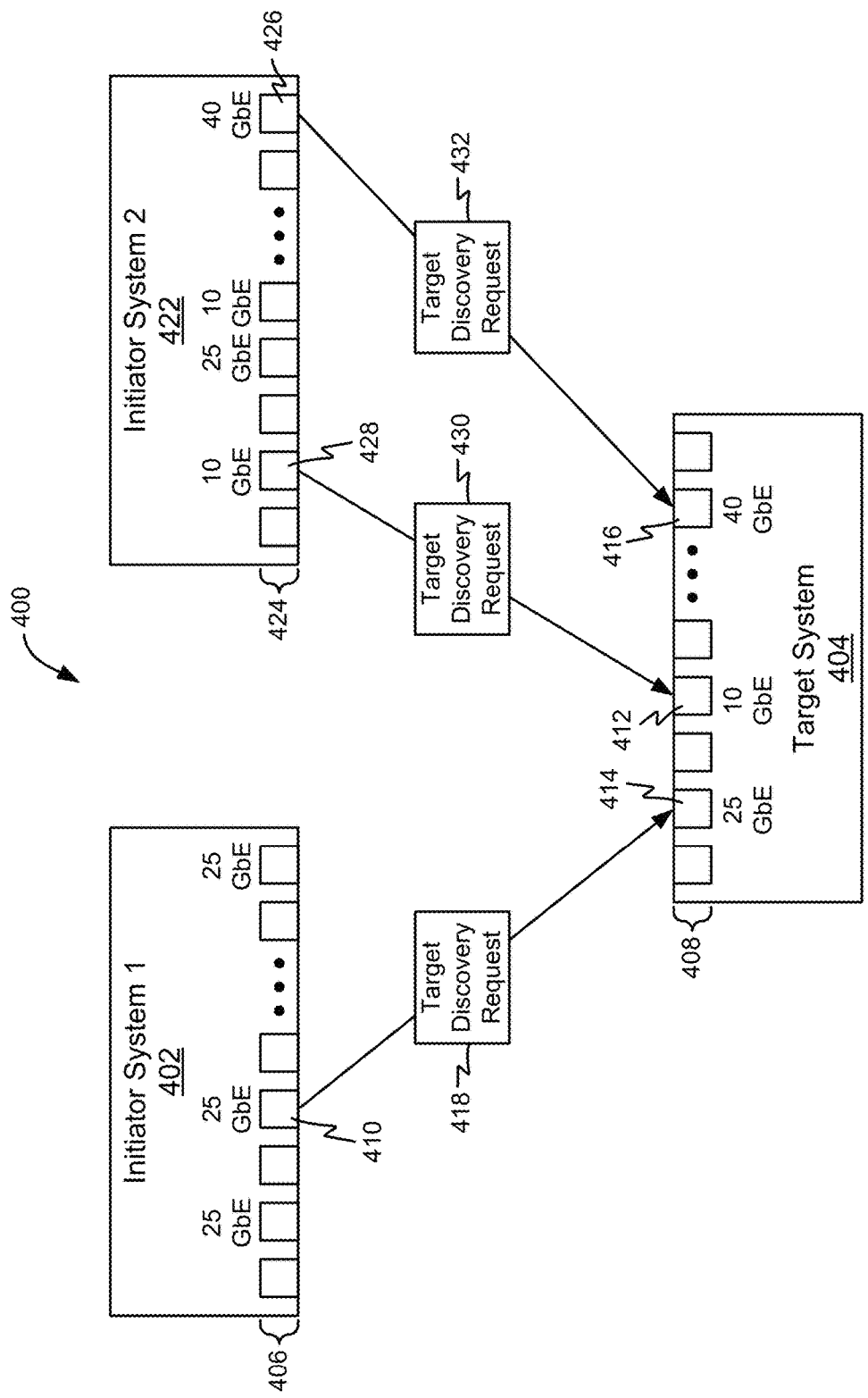
FIG. 4 shows a simplified diagram of a system according to one embodiment.

With reference to FIG. 4, a multi-speed and multi-protocol Ethernet environment 400 is shown according to one embodiment, that may be used in the context of embodiments described herein for optimized storage target discovery in the multi-speed and multi-protocol Ethernet environment 400 via selective and managed port grouping.

Because of the creation of various high-speed interconnect protocols, and the desire to obtain faster and faster communication speeds and throughput, data center administrators have quickly adopted these faster Ethernet speeds while maintaining legacy Ethernet infrastructures, resulting in mixed Ethernet speed setups. These mixed Ethernet speed setups are becoming more and more common (e.g., 10 gigabits per second Ethernet (GbE), 25 GbE, 40 GbE, 100 GbE, etc.). Moreover, in these multi-speed Ethernet environments, multiple protocols are also being supported in the same data center, e.g., Internet Small Computer Systems Interface (iSCSI), iSCSI Extensions for Remote Direct Memory Access (iSER), Non-Volatile Memory Express over Fabrics (NVMeF), Remote Direct Memory Access (RDMA), Internet Wide-Area RDMA (iWARP), RDMA over Converged Ethernet (RoCE), etc. Trying to manage connections in this multi-speed and multi-protocol Ethernet environment 400 may lead to misconfigurations that result in sub-optimal performance.

Most conventional target discovery models for discovering connections to a storage device (such as a back-end storage device) do not include a method of communicating port speeds and protocols that are available on the target side of a handshake between an initiator system 402 (i.e., "Initiator System 1") and a target system 404. Typically, there are three ways target discovery is performed (i.e., iSCSI "SendTargets," Internet Storage Name Service (iSNS), and Static Discovery). Each of these discovery models are known in the art, and are not further described herein due to their known characteristics. None of these discovery models have the capability to match port speed and to match protocol between ports. As a result, if traditional discovery models are used for port discovery, the target system 404 (which may be a storage device or some other system on which the initiator system intends to connect one or more ports) returns all ports and the initiator system 402 selects which ports to connect to (up to and including all ports on the target system 404), which may lead to connections between ports with mismatched speeds, or outright failure to connect due to non-interoperable protocol conflicts. These issues slow the discovery process, produce failed sessions, cause administrative hassles, and produce issues that are correctable only after being attempted in the field. Although these issues may be solved by an administrator manually connecting an initiator port to a target port through a static login, while maintaining port speed and protocol information in a log for reference during the process. However, this manual task is extremely cumbersome and error prone because the total number of ports in a data center is vast, and manually connecting initiator ports to target ports in this way would be extremely time consuming to the point of infeasibility.

However, due to this lack of information during conventional discovery models, the target system 404 may return information about all available ports 408 on the target system 404 to the initiator system 402 regardless of speed and protocol capabilities. Therefore, port(s) 406 on the initiator system 402 having a particular speed may be connected to port(s) 408 on the target system 404 with one or more different speed capabilities, resulting in mismatched speeds between the ports.

For example, the initiator system 402 may attempt to discover target ports through a 25 GbE initiator port 410. In response to receiving a target discovery request 418, the target system 404 may respond with connection information for all ports 408 of the target system 404, with these ports 408 having several different connection speeds, e.g., 10 GbE target port 412, 25 GbE target port 414, and 40 GbE target port 416, etc. As a result, the 25 GbE initiator port 410 on the initiator system 402 may connect with the 10 GbE target port 412. This would lead to sub-optimal performance during communications which utilize this port-to-port connection, as the full breadth of the speed of the 25 GbE initiator port 410 is not able to be utilized, due to the connection with the slower 10 GbE target port 412. Instead, it is advantageous for the 25 GbE initiator port 410 to couple with the 25 GbE target port 414.

In addition to multiple speeds causing performance issues in the multi-speed and multi-protocol Ethernet environment 400, multiple protocols are being adopted in the data center industry, e.g., iSCSI, iSER, NVMeF, etc. In addition, these protocols may be implemented in layered configurations, such as over Layer-2 protocols, e.g., RoCE version 1 (v1), etc., and/or Layer-3 protocols, e.g., iWARP, RoCE v2, etc. In the multi-protocol Ethernet environment 400, the initiator system 422 (i.e., "Initiator System 2") is interested in discovering target ports that match particular protocol(s) utilized by the initiator ports 426, 428. This is because Layer-2 protocols (e.g., RoCE v1) and Layer-3 protocols (e.g., iWARP, RoCE v2, etc.) do not typically interoperate with other protocols operating on the same or different layers. Most conventional target discovery models do not include a method of communicating protocol types that are available on the target side of a handshake between the initiator system 402 and the target system 404.

For example, in a case where a target system 404 that supports both RoCE ports and iWARP ports returns connection information for all ports 408 in response to a target discovery request 430 from an initiator system 422 (i.e., "Initiator System 2"), an initiator port 428 that utilizes iWARP from amongst all ports 424 on the initiator system 422 might attempt to connect to a target port 412 that utilizes RoCE. However, these two ports are unable to communicate with each other due to their protocol conflict (iWARP and RoCE are not interoperable). Therefore, even though the ports are matched for their speed (10 GbE), the connection between the 10 GbE initiator port 428 and the 10 GbE target port 412 would fail due to protocol non-operability issues.

In another example, in a case where the target system 404 returns connection information for all ports 408 in response to a target discovery request 432 from the initiator system 422, a 40 GbE initiator port 426 that utilizes iSCSI over TCP might attempt to connect to a 40 GbE target port 416 that utilizes iWARP. However, these two ports are unable to communicate with each other due to their protocol conflict (iWARP and iSCSI over TCP are not interoperable). Therefore, even though the ports are matched for their speed (40 GbE), the connection between the 40 GbE initiator port 426 and the 40 GbE target port 416 would fail due to protocol non-operability issues. This situation and others like it lead to administrative issues that compound on themselves.

In order to overcome these issues in conventional discovery models, a mechanism is described herein in accordance with several embodiments that provides an administrator with the information needed to match speeds and protocols between ports of an initiator system and a target system even when the discovery process does not provide for such information. In addition, the mechanism described herein in accordance with several embodiments provides a limiting function to a number of host sessions that are allocated to a target controller in order to prevent all initiator ports of a particular initiator system from being connected to a particular target system and monopolized by the initiator system. This situation, if not managed through the limiting mechanism, increases the number of open sessions, wastes resources on the initiator system and target system (which may have session limitations), and does not provide performance benefits to the arrangement.

Figure 5:
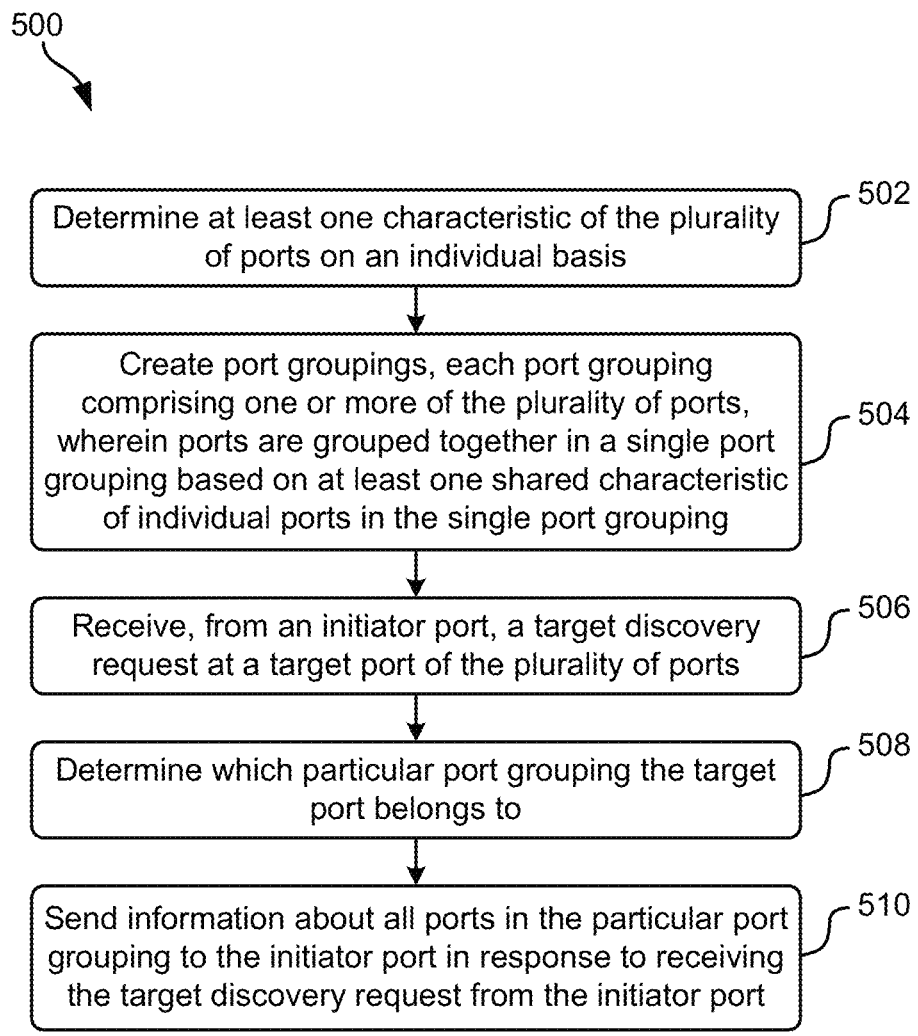
FIG. 5 shows a flowchart of a method, according to one embodiment.

Now referring to FIG. 5, a method 500 is shown according to one embodiment. The method 500 may be performed in accordance with the present invention in any of the environments depicted in FIGS. 1-4, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by a microprocessor, a server, a cluster of computing devices (e.g., a local cluster), a processing circuit having one or more processors therein, or some other device comprising one or more processors. The processing circuit, e.g., processor(s), chip(s), and/or module(s) implemented in hardware and/or software, and preferably having at least one hardware component, may be utilized in any device to perform one or more steps of the method 500. Illustrative processors include, but are not limited to, a MPU, a CPU, an ASIC, a FPGA, etc., combinations thereof, or any other suitable computing device known in the art.

Method 500 overcomes the issues related to conventional discovery models in multi-speed and multi-protocol environments by selectively returning groups of Ethernet ports having a matching speed and a matching protocol to an initiator port on an initiator system. In this way, a target storage controller groups together Ethernet ports based on the port's individual speed and protocol and responds to discovery requests from an initiator system using applicable port grouping(s).

As shown in FIG. 5, method 500 may start with operation 502, where at least one characteristic of a plurality of ports are determined on an individual basis. Any technique may be used to determine the at least one characteristic, such as by consulting with a table or database that stores such information, querying the ports to receive requested information, testing the ports to determine the at least one characteristic, etc.

The plurality of ports are hosted by a target system (referred to as a target system because it is the target of a port discovery request, but may be any type of system, server, host, etc., that is configured to host multiple ports) and each port is configured to send and/or receive data. The target system may include a processing circuit of a type known in the art, a controller for storage management functions, and/or any other typical components of a storage system known in the art. Moreover, the at least one characteristic may represent any aspect of the ports, such as type of port (e.g., Ethernet, serial, parallel, Universal Serial Bus (USB), etc.), maximum speed of the port (measured by a common standard, such as GB/second, packets/second, etc.), protocol used for communications (e.g., iSCSI, iSER, NVMeF, iWARP, RoCE, etc.), etc.

In operation 504, port groupings are created that logically group together (and therefore divide up) the ports of the target system. Each port grouping includes one or more of the plurality of ports, with certain ports being grouped together in a single port grouping based on at least one shared characteristic of individual ports in the single port grouping. In this way, multiple port groupings may be created, with each port grouping including ports which share common characteristic(s).

In one embodiment, none of the plurality of ports are included in more than one port grouping. In this way, a port is not duplicated in multiple port groupings, to ensure that as port groupings are provided to respond to target discovery requests, a port is not provided to more than one request.

In another embodiment, each port grouping may include a maximum number of ports. This maximum number of ports that may be included in a port grouping may be set by an administrator, or automatically set to evenly divide a largest port grouping into multiple port groupings that each have a desired number of ports that may be assigned to a single initiator port. In this way, port monopolization by a single initiator is avoided, thereby providing more optimized performance and usage of the plurality of ports.

In one embodiment, each port in a single port grouping may share one characteristic selecting from a group of characteristics that include maximum port speed and a protocol that the port uses for communications. For example, all ports in a single port grouping may share the same communications protocol, e.g., iSCSI, iSER, NVMeF, iWARP, RoCE, etc. In another example, all ports in a single port grouping may have about a same speed, e.g., within about 5% of one another in terms of throughput per second.

In a further embodiment, each port in a single port grouping may share two characteristics: they may all share the same communications protocol and they may all have about a same speed, e.g., within about 5% of one another in terms of throughput per second. Some exemplary speeds include, but are not limited to, 10 GbE, 100 GbE, 1 TbE, etc.

In a further approach, unique port grouping identifiers (ID) may be assigned individually to the port groupings. In this way, each port grouping may be referred to quickly and uniquely using the port grouping ID which is assigned thereto. The port grouping IDs may be numeric, alphabetic (text-based), alphanumeric, hexadecimal, or utilize some other suitable code to distinguish each individual port grouping from one another, at least on a local basis (e.g., within the target system) and possibly on a global scale across all target systems in a particular data center.

In operation 506, a target discovery request is received at a target port of the plurality of ports. The target discovery request is received from an initiator port (which is hosted by an initiator system). Typically, the target discovery request is sent out in order to ascertain or learn about available ports on a target system. Therefore, the target system is expected to respond to the target discovery request with information about ports on the target system.

In operation 508, a particular port grouping which includes the target port on which the target discovery request was received is determined, e.g., which port grouping the target port belongs to is determined. In other words, membership of the target port in a particular port grouping is determined, such that the association between the target port and this particular port grouping is discovered, and any other ports in this particular port grouping (which share at least one characteristic with the target port) may be identified based on their membership in the particular port grouping. Any suitable technique may be used to make this determination, such as identifying a port grouping ID of the port grouping to which the target port belongs, ascertaining the distinguishing characteristic(s) of the target port and which port grouping has this/these distinguishing characteristic(s), etc.

In one embodiment, the ports in the particular port grouping all share at least one characteristic with the initiator port, such as the same or similar speed, the same communications protocol, etc.

In operation 510, information about all ports in the particular port grouping are sent to the initiator port in response to receiving the target discovery request from the initiator port.

In one approach, method 500 may further include providing information about the port groupings to a requesting system, such as via a command line interface (CLI) or some other suitable interface configured to receive and respond to inquiries. In this way, the initiator system is able to determine how many different combinations of characteristics are present for the ports of the target system. In a further approach, the specific port grouping IDs may be provided to the initiator system.

In another approach, method 500 may include connecting the initiator system (which hosts the initiator port) to the specific ports in the particular port grouping that was returned to the initiator system in response to the target discovery request. In this way, the initiator port may now communicate via the select ports in the particular port grouping which are optimized for communication via the initiator port of the initiator system according to the at least one characteristic (e.g., speed, protocol, type, etc.).

In one example, method 500 may be used to group target ports together based on one or more characteristics (a preferred grouping is based on speed and protocol) and then using these port groupings to send discovery response(s) to initiator system(s) depending upon which target port a target discovery request is received on.

In a specific example, on the target system, groupings of up to N ports of the same type (e.g., Ethernet, USB, serial, etc.) are created, with N being the maximum number of ports allowed in any one grouping. A port grouping may be assigned and subsequently identified by a port grouping ID.

As previously described, a port grouping may only have a maximum number, N, of ports that share the same speed (within +/−5%) and communications protocol, to ensure communications are possible with an initiating port. Each port may only be a part of a single port grouping, and in a case where there are multiple ports of the same speed and protocol, they are split into multiple port groupings to limit the number of ports in a single port grouping to N or less. This grouping may be performed automatically or manually by an administrator based on the information of each individual port.

In the case of automatic grouping, a port grouping ID is associated with each port in the grouping upon port address assignment automatically by the target system, such as by checking a maximum supported port speed and communication protocols supported. The address assigned may be an internet protocol (IP) address, media access control (MAC) address, or some other type of address commonly assigned to ports for location thereof in order to facilitate communications.

In the case of manual grouping, a port may be associated with a particular port grouping ID during port configuration manually by a system administrator depending upon speed and supported protocol(s) of the ports in the port grouping.

In response to receiving a target discovery request from an initiator system on a specific target port, such as via the SendTargets discovery method known in the art, the target system returns information about all ports belonging to the port grouping indicated by the port grouping ID that is associated with the target port.

In one example, in response to the initiator port querying a target port having a speed of 10 GbE that supports the iWARP protocol and is associated with the port grouping ID of 3333, the target system returns information about target ports that belong to the port grouping having the port grouping ID of 3333. In this case, the port grouping having an ID of 3333 only includes ports having a speed of 10 GbE (and within +/−5%) that are capable of communications via iWARP. Accordingly, if the initiator system includes 10 GbE iWARP ports, the administrator is inclined to send out queries to target ports that match these characteristics. Port grouping information for the Storage Target controller is therefore made available, via CLIs or some other suitable interface, on the target system.

After receiving the information about target ports that belong to the port grouping having the port grouping ID of 3333, the initiator system is connected to the ports having the matching speed/protocol only, instead of being connected to all ports of the target system indiscriminately. For example, the target system may initiate a discovery request through a 40 GbE ROCE port to a 40 GbE ROCE target port, which has been tagged with port grouping ID 5050. The initiator system receives information about the various 40 GbE ROCE ports available on the target system, such as in a list with IP addresses, MAC addresses, etc., for the 40 GbE ROCE ports of the port grouping having ID 5050.

Method 500 may be implemented in a system and/or a computer program product. For example, a system may include a processing circuit and logic integrated with the processing circuit, executable by the processing circuit, or integrated with and executable by the processing circuit. By integrated with, what is meant is that the processing circuit is a hardware processor that has hardcoded logic included therewith, such as an ASIC, a FPGA, etc. By executable by, what is meant is that the processor is configured to execute software logic to achieve functionality dictated by the software logic, with the processor possibly being a MPU, a CPU, a microprocessor, etc. The logic is configured to cause the processing circuit to perform method 500.

In another example, a computer program product may include a computer readable storage medium having program instructions embodied therewith. The computer readable storage medium may be any suitable storage device known in the art that is configured to store and allow computer access to information stored therein. The embodied program instructions are executable by a processing circuit to cause the processing circuit to perform method 500.

Figure 6:
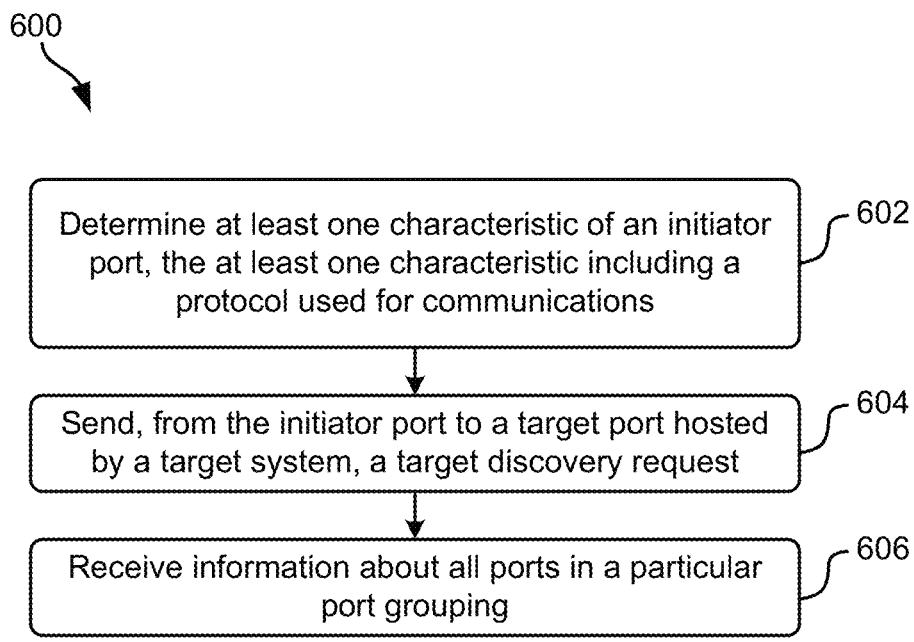
FIG. 6 shows a flowchart of a method, according to another embodiment.

Now referring to FIG. 6, a method 600 is shown according to one embodiment. The method 600 may be performed in accordance with the present invention in any of the environments depicted in FIGS. 1-4, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by a microprocessor, a server, a cluster of computing devices (e.g., a local cluster), a processing circuit having one or more processors therein, or some other device comprising one or more processors. The processing circuit, e.g., processor(s), chip(s), and/or module(s) implemented in hardware and/or software, and preferably having at least one hardware component, may be utilized in any device to perform one or more steps of the method 600. Illustrative processors include, but are not limited to, a MPU, a CPU, an ASIC, a FPGA, etc., combinations thereof, or any other suitable computing device known in the art.

As shown in FIG. 6, method 600 may start with operation 602, where at least one characteristic of an initiator port is determined. The at least one characteristic may include any relevant aspect of the initiator port, such as type of port (e.g., Ethernet, serial, parallel, Universal Serial Bus (USB), etc.), maximum speed of the port (measured by a common standard, such as GB/second, packets/second, etc.), protocol used for communications (e.g., iSCSI, iSER, NVMeF, iWARP, RoCE, etc.), etc. In one embodiment, the characteristic includes a protocol that the port uses for communications.

The initiator port is hosted by an initiator system, which may have a controller, a processing circuit, etc., and a plurality of ports (of the same or different types as the initiator port, with the same or different speeds, the same or different protocol capabilities, etc.).

In operation 604, a target discovery request is sent from the initiator port to a target port hosted by a target system. The target discovery request is destined for a port which is intended to have at least one matching characteristic, such as speed, protocol, etc. At least one characteristic of the port to which the target discovery request is sent may be learned by the initiator system based on information made available to the initiator system, either through direct query, or via consultation with a database, table, list, etc., which includes port information of at least the target system.

In operation 606, information about all ports in a particular port grouping is received. In one embodiment, the ports in the particular port grouping all share at least one characteristic, e.g., speed, protocol, etc., of the initiator port.

Method 600 may further include accessing information about port groupings on the target system, such as via a CLI or some other suitable interface, in one embodiment.

According to another embodiment, method 600 may include connecting the initiator port to at least one of the ports in the particular port grouping.

In one approach, the particular port grouping includes a maximum number of ports that share protocol and have about a same speed, thereby ensuring that any initiator port which is connected to the ports of the particular port grouping will perform optimally when the initiator port has the same protocol and have about the same speed (e.g., within +/−5%).

Method 600 may be implemented in a system and/or a computer program product. For example, a system may include a processing circuit and logic integrated with the processing circuit, executable by the processing circuit, or integrated with and executable by the processing circuit. By integrated with, what is meant is that the processing circuit is a hardware processor that has hardcoded logic included therewith, such as an ASIC, a FPGA, etc. By executable by, what is meant is that the processor is configured to execute software logic to achieve functionality dictated by the software logic, with the processor possibly being a MPU, a CPU, a microprocessor, etc. The logic is configured to cause the processing circuit to perform method 600.

In another example, a computer program product may include a computer readable storage medium having program instructions embodied therewith. The computer readable storage medium may be any suitable storage device known in the art that is configured to store and allow computer access to information stored therein. The embodied program instructions are executable by a processing circuit to cause the processing circuit to perform method 600.

By using the methods and techniques described herein in various embodiments, target discovery is simplified and usage of target ports after being coupled thereto is optimized. Moreover, the tasks of the system administrator are lessened and made less error prone, by eliminating target ports from a selection pool which are not matched to an initiator port.

In addition, speed and protocol mismatches between a target system and an initiator system are avoided, leading to increased performance and avoidance of login failures. By avoiding these issues, less support calls to manufacturers of storage systems will be received for assistance when attempting target discovery procedures, and significant savings in terms of time and effort are possible for support, test, and development engineers during deployment. This allows for target discovery to take place efficiently in a complex multi-speed and multi-protocol Ethernet setup.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an ASIC, a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a CPU, an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A system, comprising:
a plurality of ports configured to send and receive data;
a processing circuit coupled to the plurality of ports; and
logic integrated with the processing circuit, executable by the processing circuit, or integrated with and executable by the processing circuit, the logic being configured to cause the processing circuit to:
determine at least one characteristic of the plurality of ports on an individual basis;
select the ports having at least one shared characteristic;
split the selected ports having the at least one shared characteristic into multiple port groupings, wherein none of the selected ports having the at least one shared characteristic are included in more than one of the port groupings;
receive, from an initiator port, a target discovery request at a target port of the plurality of ports;
determine which particular port grouping the target port belongs to, wherein the ports in the particular port grouping all share a characteristic of the initiator port, the characteristic being a protocol used for communications;
send information about all ports in the particular port grouping to the initiator port in response to receiving the target discovery request from the initiator port;
receive, from the initiator port, a second target discovery request at one of the ports in the particular port grouping other than the target port; and
connect the initiator port to the port that received the second target discovery request.

2. The system as recited in claim 1, wherein the logic is further configured to cause the processing circuit to:
assign unique port grouping identification numbers individually to the port groupings, wherein a maximum number of ports are included in any one of the port groupings; and
provide information about the port groupings via a command line interface (CLI).

3. The system as recited in claim 1, wherein all of the selected ports having the at least one shared characteristic are evenly divided into the multiple port groupings.

4. The system as recited in claim 1, wherein each of the port groupings is limited to a predefined maximum number of ports, wherein the number of port groupings is a function of the predefined maximum number and a total number of the ports having the at least one shared characteristic.

5. A method, comprising:
determining at least one characteristic of a plurality of ports on an individual basis, wherein the plurality of ports are hosted by a target system and configured to send and receive data;
select the ports having at least one shared characteristic;
split the selected ports having the at least one shared characteristic into multiple port groupings, wherein none of the of selected ports having the at least one shared characteristic are included in more than one of the port groupings;
receiving, from an initiator port, a target discovery request at a target port of the plurality of ports;
determining which particular port grouping the target port belongs to, wherein the ports in the particular port grouping all share a characteristic of the initiator port, the characteristic of the initiator port being protocol used for communications;
sending information about all ports in the particular port grouping to the initiator port in response to receiving the target discovery request from the initiator port;
receiving, from the initiator port, a second target discovery request at one of the ports in the particular port grouping other than the target port,
wherein the ports in the particular port grouping all share a characteristic of the initiator port, the characteristic being maximum speed; and
connecting the initiator port to the port that received the second target discovery request.

6. The method as recited in claim 5, further comprising:
assigning unique port grouping identification numbers individually to the port groupings, wherein a maximum number of ports are included in any one of the port groupings; and
providing information about the port groupings via a command line interface (CLI).

7. The method as recited in claim 5, wherein all of the selected ports having the at least one shared characteristic are evenly divided into the multiple port groupings.

8. The method as recited in claim 7, wherein each of the port groupings is limited to a predefined maximum number of ports that share protocol and have about a same speed, wherein the number of port groupings is a function of the predefined maximum number and a total number of the ports having the at least one shared characteristic.

9. A computer program product, the computer program product comprising a computer readable storage medium having program instructions embodied therewith, the embodied program instructions being executable by a processing circuit to cause the processing circuit to:
determine, by the processing circuit, at least one characteristic of a plurality of ports on an individual basis, wherein the plurality of ports are hosted by a target system and configured to send and receive data;
select, by the processing circuit, the ports having at least one shared characteristic;
split, by the processing circuit, the selected ports having the at least one shared characteristic into multiple port groupings, wherein none of the of selected ports having the at least one shared characteristic are included in more than one of the port groupings;

receive, by the processing circuit from an initiator port, a target discovery request at a target port of the plurality of ports;

determine, by the processing circuit, which particular port grouping the target port belongs to, wherein the ports in the particular port grouping all share a characteristic of the initiator port, the characteristic of the initiator port being protocol used for communications;

send, by the processing circuit, information about all ports in the particular port grouping to the initiator port in response to receiving the target discovery request from the initiator port;

receive, by the processing circuit from the initiator port, a second target discovery request at the target port; and in response to receiving the second target discovery request at the target port, connect, by the processing circuit using the information about the ports in the particular grouping, the initiator port to another port in the particular grouping other than the target port based on a determination that the another port has about a same speed as the target port.

10. The computer program product as recited in claim 9, wherein the embodied program instructions are further executable by the processing circuit to cause the processing circuit to:

assign, by the processing circuit, unique port grouping identification numbers individually to the port groupings, wherein a maximum number of ports are included in any one of the port groupings; and provide, by the processing circuit, information about the port groupings via a command line interface (CLI).

11. The computer program product as recited in claim 9, wherein the ports in the particular port grouping all share another characteristic of the initiator port.

12. The computer program product as recited in claim 9, wherein all of the selected ports having the at least one shared characteristic are evenly divided into the multiple port groupings.

13. The computer program product as recited in claim 9, wherein each of the port groupings is limited to a predefined maximum number of ports that share protocol and have about a same speed, wherein the number of port groupings is a function of the predefined maximum number and a total number of the ports having the at least one shared characteristic.

14. An initiator system, comprising:
an initiator port;
a processing circuit; and
logic integrated with the processing circuit, executable by the processing circuit, or integrated with and executable by the processing circuit, the logic being configured to cause the processing circuit to:
determine at least two characteristics of the initiator port, the at least two characteristics including a maximum speed and a protocol used for communications;
send, from the initiator port to a target port that is hosted by a target system and has two characteristics matching the two characteristics of the initiator port, a target discovery request;
receive information about all ports in a particular grouping of ports having the two characteristics, wherein the ports in the particular port grouping all share the following characteristic of the initiator port: the protocol used for communications, wherein only some of the ports in the particular port grouping are ports of the target system;
select a second port in the particular port grouping that is not the target port in response to receiving the information; and
establish a connection with the second port.

15. The initiator system as recited in claim 14, wherein the logic is further configured to cause the processing circuit to:
access information about port groupings on the target system via a command line interface (CLI) configured to receive and respond to inquiries for enabling the initiator system to determine how many different combinations of characteristics are present for the ports of the target system.

16. The initiator system as recited in claim 14, comprising learning the two characteristics of the target port before sending the target discovery request, and selecting the second port in response to determining that the second port has the two characteristics that match the two characteristics of the initiator port.

17. The initiator system as recited in claim 14, wherein the logic is further configured to cause the processing circuit to connect the initiator port to the ports in the particular port grouping.

18. The initiator system as recited in claim 14, wherein the particular port grouping includes a maximum number of ports that share protocol.

19. A method, comprising:
determining at least one characteristic of an initiator port, the at least one characteristic including a protocol used for communications;
learning characteristics of a target port hosted by a target system;
selecting the target port in response to determining that the target port has at least one characteristic that matches the at least one characteristic of the initiator port;
sending, from the initiator port to the selected target port, a target discovery request;
receiving information about all ports of the target system that are in a particular port grouping,
wherein the ports in the particular port grouping all share the following characteristic of the initiator port: the protocol used for communications; and
connecting the initiator port to at least one of the ports in the particular port grouping other than the target port, the at least one of the ports in the particular port grouping being selected by the initiator port in response to receiving the information about all ports in the particular grouping.

20. The method as recited in claim 19, further comprising accessing information about port groupings on the target system via a command line interface (CLI) configured to receive and respond to inquiries for enabling an initiator system having the initiator port to determine how many different combinations of characteristics are present for the ports of the target system.

21. The method as recited in claim 19, wherein the ports in the particular port grouping all share another characteristic of the initiator port: maximum speed.

22. The method as recited in claim 19, wherein only some of the ports in the particular port grouping are ports of the target system.

23. The method as recited in claim 19, wherein the particular port grouping includes a maximum number of ports that share protocol and have about a same speed.

* * * * *